Nov. 17, 1964   R. L. CALLAWAY   3,157,790
NEUTRON CONVERTER
Filed Feb. 20, 1962
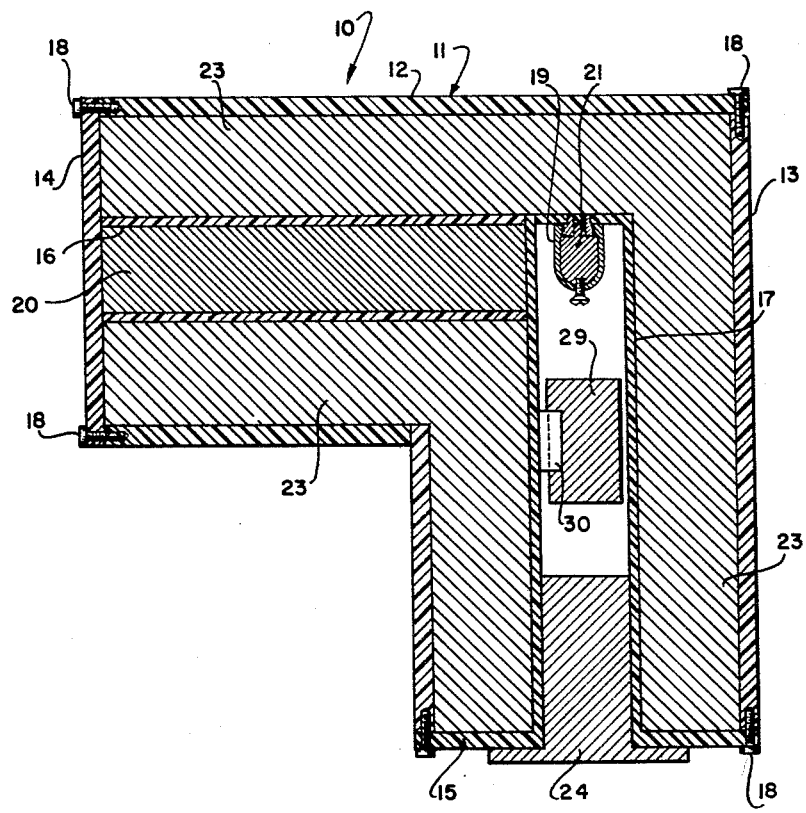
INVENTOR.
REX L. CALLAWAY
BY
*George C. Sullivan*
Agent 3,157,790
NEUTRON CONVERTER
Rex L. Callaway, Gainesville, Ga., assignor to Lockheed Aircraft Corporation, Burbank, Calif.
Filed Feb. 20, 1962, Ser. No. 174,464
4 Claims. (Cl. 250—84.5)

This invention relates to an inexpensive means for producing high energy neutron fluxes having predetermined characteristics using any available source of neutrons, and more particularly to a means for producing monoenergetic neutron fluxes having predetermined energy characteristics utilizing any available source of thermal neutrons.

It is presently known that neutron fluxes having predetermined characteristics, such as high energy monoenergetic neutron fluxes, may be obtained by using electric accelerators such as the Van de Graaff generator, the cyclotron, the Cockcroft-Walton, or other such related generators. Such prior art devices have the extreme limitation that they require an electric accelerator for producing charged particles to bombard a target. The requirement that an electric generator be used necessitates the use of heavy, bulky equipment, thus adding greatly to the cost of producing high energy neutrons; see for example, the United States Letters Patent to Gale (2,907,884).

Accordingly, it is an object of this invention to provide a new and novel means for producing neutron fluxes having predetermined characteristics using any available source of neutrons.

A further object of this invention is to provide a new and novel method for obtaining neutron fluxes having predetermined characteristics using any available source of thermal neutrons.

A further object of this invention is to provide an extremely inexpensive method of irradiating objects with neutron fluxes having predetermined characteristics.

Still another object of this invention is to provide a simply constructed, extremely inexpensive means for obtaining high energy neutron fluxes using any available source of neutrons.

Another object of this invention is to provide means for producing monoenergetic neutrons having a predetermined energy without necessitating the use of an electric generator.

Other objects and advantages will become apparent from the following description taken in connection with the accompanying drawing which is a sectional view of one embodiment of a neutron converter constructed in accordance with this invention.

Generally stated, the invention comprises a neutron converter having a first shielded column filled with a moderating material of low neutron capture cross-section, preferably a hydrogenous material, the first column angularly related to a second shielded air filled column adapted to contain an object to be irradiated and a reaction target disposed at the juncture of the columns.

More specifically, the neutron converter 10 shown in the drawing comprises an L-shaped housing 11 having a first leg 12 and a second leg 13 angularly related thereto. Legs 12 and 13 are closed by end walls 14 and 15, respectively. Enclosed in leg 12 centrally thereof is column 16 and enclosed in leg 13 centrally thereof is a second column 17. The housing 11 and the columns 16 and 17 are preferably made up of plates of Plexiglas which are secured together by aluminum screws 18. Column 16 may be called a thermal column and it is filled with a hydrogenous substance 20 such as paraffin and sealed at both ends. The outside end of column 16 is preferably sealed by the Plexiglas end wall 14 and at its interior end by a sidewall of column 17.

A container 19 housing or incapsulating reaction target 21 is removably disposed within the interior end of column 17 at the juncture of columns 16 and 17 as by a threaded connection. Target 21 may be any of a number of reaction targets which emit neutron fluxes in response to bombardment by thermal neutrons. An object to be irradiated 29 is removably mounted within column 17 on any appropriate support means 30 in line with the target 21. Columns 16 and 17 are preferably perpendicularly related and are surrounded by a neutron thermalizing and capturing agent such as a paraffin-boron carbide mixture 23 to shield the object from neutrons coming from any direction except the target. A paraffin-boron carbide plug 24 is inserted into the end of column 17 to shield the object from light and external neutrons.

To operate the converter its end wall 14 is exposed to a reactor face or other suitable source of neutron such as, for example, artificial sources, beam holes or unaltered neutron fluxes. Neutrons emitted from the source pass through the column of hydrogenous material 20 and in so doing are thermalized. The thermal neutrons thus formed bombarded the reaction target 21 which in response to this bombardment emits fast neutrons isotropically, which pass down column 17 to irradiate an object 29 mounted therein. It is to be understood, however, that the plug 24 could be removed so that an object located outside of the converter and shielded from the neutron source could be irradiated by neutrons emitted by the reaction target 21.

The character of the neutron flux emitted by the reaction target depends upon the type of target used. For example, a lithium deuterium reaction target may be disposed in a converter constructed in accordance with this invention and placed adjacent a reactor face. The neutrons from the reactor will pass down the thermal column where they are thermalized and strike the reaction target. In response to this thermal neutron bombardment, the lithium deuterium target will emit 14 mev. monoenergetic neutrons isotropically. Other and different reaction targets could as easily be used to obtain monoenergetic neutron fluxes having different characteristics.

While a particular embodiment of the invention has been shown and described, it will be obvious to those skilled in the art that various changes and modifications may be made without departing from the invention and it is intended to cover in the appended claims all such modifications and equivalents as fall within the true spirit and scope of this invention.

What is claimed is:

1. A neutron converter comprising: a column of hydrogenous material having an end adapted to be exposed to a neutron source, a shielded target disposed adjacent the other end of said column of hydrogenous material adapted to emit high energy neutrons in response to thermal neutron bombardment, and a second shield column angularly related to said first mentioned column adapted to receive high energy neutrons emitted from said target.

2. A neutron converter comprising: a pair of columns intersecting at one end, shielding encompassing the lengths of said columns, a target proximate the intersection of said columns capable of emitting high energy neutrons in response to thermal neutron bombardment, one of said clumns being filled with a hydrogenous substance, the other of said columns being shielded at its extending end.

3. Means for irradiating an object with high energy neutrons comprising, a pair of columns angularly intersecting at one end, shielding surrounding said columns, a target emitting high energy neutrons in response to thermal neutron bombardment disposed at the intersection of said columns, one of said columns being filled with a hydrogenous material and the other of said columns having means for mounting an object to be irradiated therein in alignment with said target, and means for shielding the extending end thereof.

4. A neutron converter comprising: a column of moderating material having an end adapted to be exposed to a neutron source, a shielded target disposed adjacent the other end of said column of moderating material adapted to emit high energy neutrons in response to thermal neutron bombardment, and a second shielded column angularly related to said first-mentioned column adapted to receive high energy neutrons emitted from said target.

References Cited in the file of this patent
UNITED STATES PATENTS
2,708,656  Fermi et al. _____ May 17, 1955